(12) United States Patent
Mudd et al.

(10) Patent No.: US 10,036,662 B2
(45) Date of Patent: Jul. 31, 2018

(54) FLOW RATE CALCULATION SYSTEM AND FLOW RATE CALCULATION METHOD

(71) Applicant: HORIBA STEC, Co., Ltd., Kyoto-shi, Kyoto (JP)

(72) Inventors: Daniel Thomas Mudd, Reno, NV (US); William Wylie White, Sparks, NV (US)

(73) Assignee: HORIBA STEC, Co., Ltd., Kyoto-shi, Kyoto (JP)

( * ) Notice: Subject to any disclaimer, the term of this patent is extended or adjusted under 35 U.S.C. 154(b) by 0 days.

(21) Appl. No.: 15/837,967

(22) Filed: Dec. 11, 2017

(65) Prior Publication Data

US 2018/0164138 A1 Jun. 14, 2018

(30) Foreign Application Priority Data

Dec. 13, 2016 (JP) .................... 2016-241701

(51) Int. Cl.
 *G01F 9/00* (2006.01)
(52) U.S. Cl.
 CPC .................... *G01F 9/003* (2013.01)
(58) Field of Classification Search
 CPC ............ G01F 1/86; G01F 9/003; G01F 25/00
 See application file for complete search history.

(56) References Cited

U.S. PATENT DOCUMENTS

| | | | | |
|---|---|---|---|---|
| 7,909,208 B2* | 3/2011 | Skordas | ................. | G01G 17/04 222/1 |
| 8,210,022 B2* | 7/2012 | Moriya | ................. | G05D 7/0635 73/1.35 |
| 8,340,827 B2* | 12/2012 | Yun | ................. | G05D 7/0635 137/487.5 |
| 9,376,345 B2* | 6/2016 | Forgeron | ............ | C04B 40/0231 |
| 9,910,448 B2* | 3/2018 | Horwitz | .................... | G01F 1/76 |

FOREIGN PATENT DOCUMENTS

JP 2005134138 A 5/2005

OTHER PUBLICATIONS

Mudd, D. et al., "Building a Primary Mass Flow Standard, 'PMFS'," Technical Journal "Readout", No. 38, May 2011, 8 pages.

* cited by examiner

*Primary Examiner* — Jewel V Dowtin
(74) *Attorney, Agent, or Firm* — Alleman Hall Creasman & Tuttle LLP

(57) ABSTRACT

To accurately calibrate fluid control equipment. A flow rate calculation system includes: a container in which gas is enclosed; a weight measurement part on which the container is disposed; a gas line which connects the container and fluid control equipment and in which the gas flows; and an enclosing line for enclosing the gas in the container disposed on the weight measurement part, thereby allowing the gas to flow from the container to the fluid control equipment or from the fluid control equipment to the container in a state that the container is disposed on the weighing measurement part, and calculating a flow rate of the gas flowing to the fluid control equipment based on an output value outputted from the weight measurement part, and the container and the weight measurement part are adapted to be placed in a decompressed decompression chamber.

5 Claims, 2 Drawing Sheets

FLOW RATE CALCULATION SYSTEM AND FLOW RATE CALCULATION METHOD

TECHNICAL FIELD

The present invention relates to a flow rate calculation system of a calibration system and a flow rate calculation method of a calibration method for use in calibration of, for example, fluid control equipment.

BACKGROUND ART

Conventionally, as a calibration system of this kind, as shown in, for example, Patent Literature 1, there is disclosed a calibration system configured so that gas is allowed to flow from a gas cylinder disposed on an electronic balance to fluid control equipment and, for example, a fluid control valve provided in the fluid control equipment is calibrated so that the gas flow rate outputted from the fluid control equipment at this time is matched with a gas flow rate allowed to flow from the cylinder to the fluid control equipment.

More specifically, this calibration system is configured so that, by utilizing the fact that a measurement value of an electronic balance is varied with consumption of gas in the cylinder, a gas flow rate flowing from the cylinder to the fluid control equipment is calculated based on a variation amount of this measurement value.

However, in practice, a pressure inside the cylinder is reduced with consumption of the gas and a temperature of the gas inside the cylinder and a temperature of the cylinder per se are varied, which results in that convection occurs around the cylinder and water droplets are adhered on a surface of the cylinder.

Therefore, the measurement value of the electronic balance becomes a value including an influence of the convection or the water droplets mentioned above, and it is difficult to accurately calculate a gas flow rate flowing from the cylinder to the fluid control equipment based on the variation amount of this measurement value, and there arises a problem that the fluid control equipment cannot be calibrated with accuracy.

CITATION LIST

Patent Literature

Patent Literature 1: JPA 2005-134138

SUMMARY OF INVENTION

Technical Problem

Therefore, the present invention has been made in order to solve the above problems, and an essential object thereof is to calibrate fluid control equipment with accuracy.

Solution to Problem

That is, a flow rate calculation system according to the present invention includes: a container in which gas is enclosed; a weight measurement part on which the container is disposed; a gas line which connects the container and fluid control equipment and in which the gas flows; and an enclosing line for enclosing the gas in the container disposed on the weight measurement part, thereby allowing the gas to flow from the container to the fluid control equipment or from the fluid control equipment to the container in a state that the container is disposed on the weight measurement part, and calculating a flow rate of the gas flowing to the fluid control equipment based on an output value outputted from the weight measurement part, wherein the container and the weight measurement part are placed in a decompressed decompression chamber.

With this flow rate calculation system, since the container is placed in the decompression chamber, for example, by evacuating the inside of the decompression chamber, even if a pressure inside the container is reduced with consumption of the gas, there arises no convection around the container, and also there arises no water droplet attached to a surface of the container. Thus, the flow rate of the gas allowed to flow to the fluid control equipment from the container can be correctly obtained based on the output value of the weight measurement part and it is possible to calibrate the fluid control equipment with accuracy.

Further, in the case where the container is placed in the atmosphere, it is necessary to consider the influence of the buoyancy applied to the container with respect to the output value of the weight measurement part, but with the flow rate calculation system according to the present invention, since the container is placed in the decompression chamber, it is not necessary to consider the influence of the buoyancy mentioned above, and the flow rate flowing in the fluid control equipment can be correctly obtained based on the output value of the weight measurement part and it is possible to calibrate the fluid control equipment with accuracy.

Moreover, since the fluid control equipment can be calibrated with the container being disposed on the weight measurement part, it is possible to reduce the time and labor taken for the calibration.

In addition, since the gas can be enclosed in the container disposed on the weight measurement part via the enclosing line, it is not necessary to take out the container from the decompression chamber when the gas is enclosed in the container, and the fluid control equipment can be calibrated while keeping the decompression chamber at a constant vacuum degree. Thus, by performing over multiple calibrations substantially under the same conditions, the fluid control equipment can be calibrated with higher accuracy.

Further, in the case where the container is taken out from the decompression chamber and then the gas is enclosed, it is necessary to evacuate the inside of the decompression chamber every time, but with the configuration described above, it is possible to enclose the gas in the container while keeping the inside of the decompression chamber in a vacuum state, and therefore the fluid control equipment can be calibrated without taking time and labor.

It is preferable that a part of the gas line is formed of a flexible tube located in the decompression chamber.

With this configuration, vibrations caused, for example, when the gas flows in the gas line and tensions transmitted from the gas line to the container are absorbed by the flexible tube, and therefore it is possible to remarkably reduce an error caused in the output value of the weight measurement part.

It is preferable that the enclosing line is joined at a confluent point provided in the gas line and a part in a container side with respect to the confluent point in the gas line is formed of a flexible tube located in the decompression chamber.

With this configuration, since a part of the gas line in which the gas flows in common at the time of enclosing and outflowing is formed of the flexible tube, it is not necessary that the enclosing line is formed of another flexible tube and therefore the cost can be reduced.

Furthermore, by sharing a part of the gas line and the enclosing line, it is possible to reduce the members of such as pipes that form the respective lines to thereby reduce the cost.

It is preferable that at least a part of the gas line and the enclosing line is shared in the decompression chamber.

With this configuration, a piping structure can be simplified in the vacuum chamber where connection of the piping and the like tends to be difficult, and therefore assembling of the entire system is facilitated.

Further, according to the flow rate calculation method according to the present invention, it is possible to obtain the same effect as the flow rate calculation system described above.

That is, the flow rate calculation method according to the present invention includes: allowing the gas to flow from the container to fluid control equipment or from the fluid control equipment to the container in a state that a container in which the gas is enclosed is disposed on a weight measurement part; and calculating a flow rate of the gas flowing to the fluid control equipment based on an output value outputted from the weight measurement part, wherein the container and the weight measurement part are placed in a decompressed decompression chamber.

Advantageous Effects of Invention

According to the present invention configured as described above, the fluid control equipment can be calibrated with accuracy.

DESCRIPTION OF EMBODIMENTS

The following describes one embodiment of a flow rate calculation system 200 according to the present invention with reference to the drawings.

The flow rate calculation system 200 according to the present embodiment is a part of a calibration system 100 for calibrating fluid control equipment MFC which is used in, for example, semiconductor manufacturing.

Figure 1:
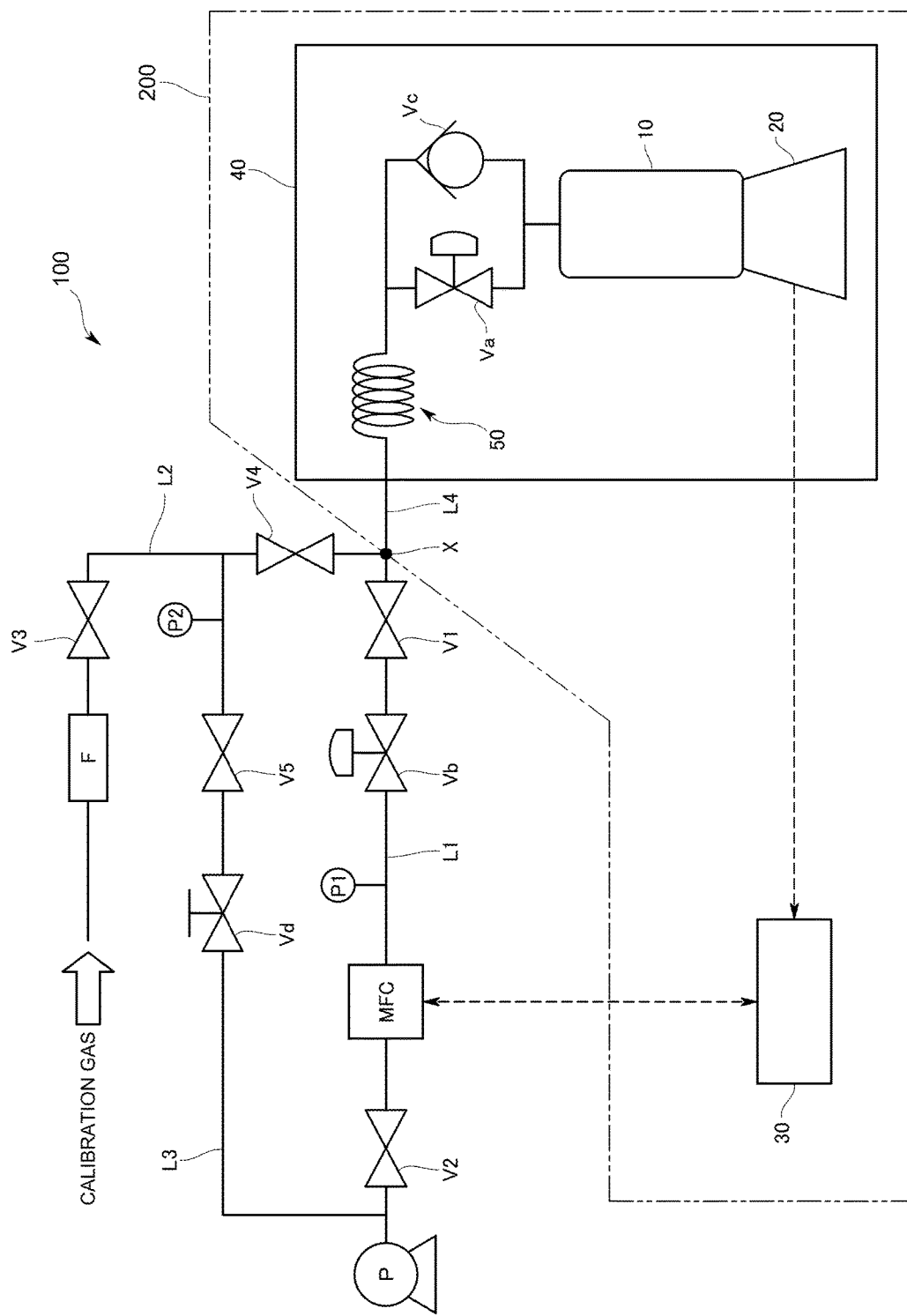
FIG. 1 is a schematic diagram showing an entire configuration of a flow rate calculation system of the present embodiment.

This calibration system 100 is intended to calibrate the fluid control equipment MFC using a so-called dynamic gravimetric method (weighing method), and specifically as shown in FIG. 1, it includes: a container 10 in which gas (also referred to as "calibration gas" hereinafter) is enclosed; an electronic balance 20 which is a weight measurement part on which the container 10 is disposed; an outflow line L1 which is a gas line allowing the calibration gas in the container 10 to flow to the fluid control equipment MFC; an enclosing line L2 for enclosing the calibration gas into the container 10; a pressure adjusting line L3 for exhausting the calibration gas in the container 10 and adjusting a pressure inside the outflow line L1; and an information processing device 30 for calibrating the fluid control equipment MFC.

Note that, this calibration system 100 does not include the fluid control equipment MFC which is a target to be calibrated.

In the calibration system 100 mentioned above, the flow rate calculation system 200 of the present embodiment includes: the container 10; the electronic balance 20; at least a part of the outflow line L1; at least a part of the enclosing line L2; and the information processing device 30, and it is intended to calculate a flow rate of the calibration gas flowing to the fluid control equipment MFC based on the output value from the electronic balance 20.

Note that the fluid control equipment MFC of the present embodiment is a mass flow controller including a thermal or differential pressure type flow rate sensor and a flow rate control valve.

The container 10 is a cylinder or the like made of, for example, carbon fibers having thermal insulation properties in which the calibration gas such as, for example, nitrogen gas is enclosed.

In the present embodiment, this container 10 is disposed on the electronic balance 20 which is disposed on a fixing base (not shown).

The outflow line L1 is provided for allowing the calibration gas in the container 10 to flow to the fluid control equipment MFC, and in specific as shown in FIG. 1, one end thereof is connected to the container 10 and the other end is connected to a suction pump P, and there are arranged a first pressure regulator Va, a first on-off valve V1, a second pressure regulator Vb, a first pressure sensor P1, the fluid control equipment MFC and a second on-off valve V2 in series from a side of the container 10 (one end side) in this order.

Note that the suction pump P is not necessarily provided and the other end of the outflow line L1 may be configured to be released to the atmosphere.

The enclosing line L2 is provided for allowing the calibration gas to flow into the container 10 disposed on the electronic balance 20 to be enclosed therein, and in specific as shown in FIG. 1, one end thereof is connected to a gas cylinder (not shown) and the other end is connected to the container 10, and there are arranged a filter, a third on-off valve V3, a fourth on-off valve V4 and a check valve Vc in series from an upstream side (one end side) of the calibration gas in this order.

With the configuration described above, the calibration gas in the container 10 flows through the first pressure regulator Va and flows out to the fluid control equipment MFC, while the calibration gas in the gas cylinder (not shown) flows through the check valve Vc and is enclosed in the container 10.

In the present embodiment, the outflow line L1 and the enclosing line L2 are joined and a part thereof is shared. More specifically, it is configured so that the enclosing line L2 is joined to the outflow line L1 at a confluent point X provided in the outflow line L1. Note that, in the present embodiment, the confluent point X is provided between the first pressure regulator Va and the first on-off valve V1 in the outflow line L1 and between the check valve Vc and the fourth on-off valve V4 in the enclosing line.

With the configuration described above, there is formed a common line L4 toward the side of the container 10 from the confluent point X in common to the outflow line L1 and the enclosing line L2, and in the present embodiment, a resin or the like flexible tube 50 having flexibility is provided in this common line L4.

The pressure adjusting line L3 is provided for exhausting the calibration gas to the outside and adjusting a pressure inside the outflow line L1 to be a predetermined pressure, and specifically as shown in FIG. 1, it is configured so as to be branched from the enclosing line L2 and to be joined to the outflow line L1.

Regarding the pressure adjusting line L3 of the present embodiment, one end thereof is connected to a portion between the third on-off valve V3 and the fourth on-off valve V4 in the enclosing line L2 and the other end thereof is connected to a portion between the suction pump P and the second on-off valve V2 in the outflow line L1, and there are arranged a second pressure sensor P2, a fifth on-off valve V5 and a needle valve Vd in series in this order from the upstream side (one end side) of the calibration gas to be exhausted.

Thus, in the flow rate calculation system 200 of the present embodiment, the container 10 and the electronic balance 20 are placed in the decompression chamber 40 (also, referred to as "vacuum chamber 40" hereinafter) with the inside thereof being decompressed.

This vacuum chamber 40 is kept to have a predetermined degree of vacuum by a decompression mechanism such as a pump (not shown) for sucking air in the vacuum chamber 40.

This decompression mechanism (not shown) is intended to keep the inside of the vacuum chamber 40 to be a predetermined degree of vacuum at least when the fluid control equipment MFC is calibrated, and in the present embodiment, it is configured so as to continue sucking of the air in the vacuum chamber 40 except for, e.g., a maintenance time and the like after assembling the calibration system 100.

In the present embodiment, the first pressure regulator Va provided in the above outflow line L1, the check valve Vc provided in the enclosing line L2 and the resin or the like tubular flexible tube 50 provided in the common line L4 are placed in this vacuum chamber 40.

Note that, in the present embodiment, the confluent point X of the above outflow line L1 and the enclosing line L2 is provided outside the vacuum chamber 40.

The information processing device 30 is intended to calibrate the fluid control equipment MFC based on the output value of the electronic balance 20 and is a general purpose or a dedicated computer physically provided with a CPU, a memory, an A/D converter, a D/A converter, and the like.

The information processing device 30 of the present embodiment is intended to calibrate the fluid control equipment MFC using a so-called dynamic weight method (weighing method).

In specific, this information processing device 30 calculates an actual flow rate per a unit time flowing from the container 10 to the fluid control equipment MFC based on weight data outputted from the electronic balance 20 and time data outputted from a timer (not shown) and creates a calibration curve between this actual flow rate and the set flow rate inputted to the fluid control equipment MFC to thereby calibrate the fluid control equipment MFC.

Next, the following describes a procedure for calibrating the fluid control equipment MFC using the calibration system 100 described above.

First, the decompression mechanism sucks air in the vacuum chamber 40 to keep at a predetermined degree of vacuum.

Then, the third on-off valve V3 and the fourth on-off valve V4 are opened in a state that each of the valves V1, V2, V5 and Va to Vd is closed, and the calibration gas is allowed to flow from a gas cylinder (not shown) to the container 10 to be enclosed therein.

Then, the third on-off valve V3 is closed and the fifth on-off valve V5 is opened while the needle valve Vd is adjusted and the calibration gas in the outflow line L1 is exhausted to the outside to thereby adjust the pressure inside the outflow line L1 to be a predetermined pressure.

Note that, in the present embodiment, the pressure inside the outflow line L1 is set to be 650 kPa.

Subsequently, the fourth on-off valve V4 and the fifth on-off valve V5 are closed while the first on-off valve V1 and the second on-off valve V2 are opened to thereby allow the calibration gas to flow from the container 10 to the fluid control equipment MFC.

More specifically, the calibration gas is allowed to flow to the fluid control equipment MFC while keeping the inside of the outflow line L1 at a predetermined pressure by the first pressure regulator Va and the second pressure regulator Vb.

Note that, in the present embodiment, each of the on-off valves V1 to V5 is configured so as to be opened and closed upon receipt of a signal from an on-off valve control part (not shown). This on-off valve control part may be provided in the information processing device 30.

Then, in the present embodiment, the information processing device 30 creates the calibration curve between the actual flow rate and the set flow rate by the weight method described above to thereby calibrate the fluid control equipment MFC.

According to the calibration system 100 according to the present embodiment configured like this, since the container 10 and the electronic balance 20 are placed in the vacuum chamber 40 which is kept at a predetermined degree of vacuum, even though the pressure inside the container 10 is lowered with consumption of the calibration gas, there occurs no convection around the container 10 and there is no water droplet adhered on a surface of the container 10 as well.

Thus, it is possible to accurately obtain an actual flow rate per a unit time of the calibration gas flowing from the container 10 to the fluid control equipment MFC base on the output values of the electronic balance 20 and a timer (not shown) and the calibration curve between this actual flow rate and the set flow rate of the fluid control equipment MFC can be created with accuracy.

Further, since the container 10 is placed in the vacuum chamber 40 which is kept at a predetermined degree of vacuum, the buoyancy applied to the container 10 is extremely small to be a substantially negligible degree and the actual flow rate can be accurately obtained based on the output values of the electronic balance 20 and the timer (not shown).

Moreover, since the container 10 has thermal insulating property, even if a temperature of the calibration gas in the container 10 is varied, the temperature of the container 10 is hardly varied and therefore it is possible to suppress the occurrence of convection around the container 10 and water droplets on the surface of the container 10.

Further, the fluid control equipment MFC can be calibrated while the container 10 is disposed on the electronic balance 20, and it is possible to reduce the labor and time required for the calibration.

In addition, since the enclosing line L2 is provided for enclosing the calibration gas in the container 10 disposed on the electronic balance 20, the calibration gas can be enclosed without taking out the container 10 from the vacuum chamber 40 and the fluid control equipment MFC can be calibrated while the vacuum chamber 40 is kept at a constant degree of vacuum. Thus, by performing over multiple calibrations substantially under the same conditions, the fluid control equipment MFC can be calibrated with higher accuracy.

Further, since the calibration gas can be enclosed in the container 10 while the inside of the vacuum chamber 40 is kept in a vacuum state, the number of times of decompressing the inside of the vacuum chamber 40 to be a predetermined degree of vacuum by the decompression means (not shown) and it is possible to calibrate the fluid control equipment MFC without taking more labor and time.

Furthermore, since the flexible tube 50 is provided in the common line L4, it is possible to absorb a vibration caused by, for example, a flow of the calibration gas and a tension transmitted from the outflow line L1 and the enclosing line L2 to the container 10 by the flexible tube and it is possible to reduce an error caused in the output value of the electronic balance 20 to be remarkably small.

Note that the present invention is not limited to the embodiment mentioned above.

Figure 2:
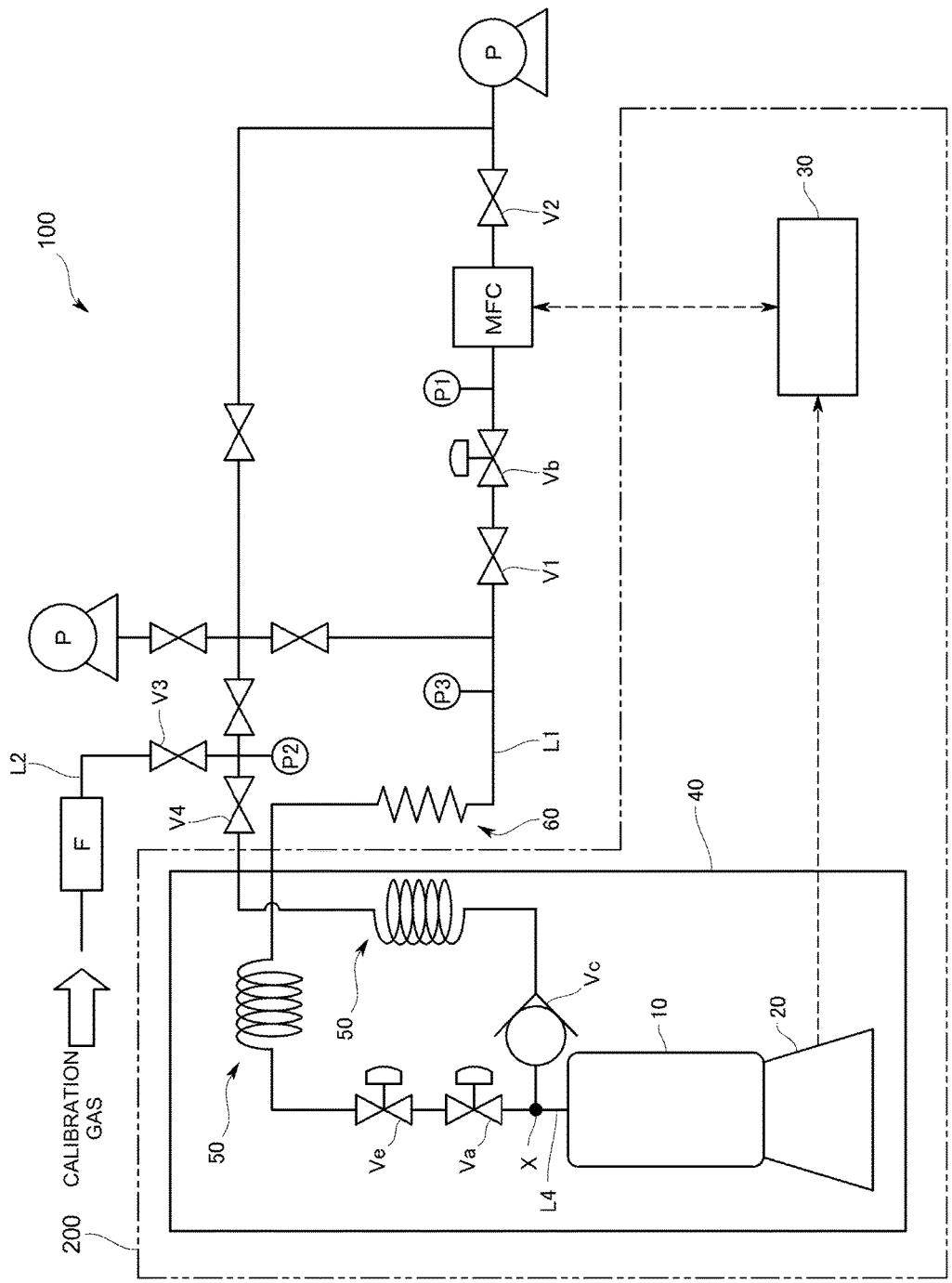
FIG. 2 is a schematic diagram showing an entire configuration of a flow rate calculation system of a modified embodiment.

For example, in the embodiment mentioned above, although the first pressure regulator Va and the second pressure regulator Vb arranged in series in the outflow line L1, a third pressure regulator Vc may be further arranged in series as shown in FIG. 2.

Thus, by sequentially opening the first pressure regulator Va and the third pressure regulator Vc, the inside of the outflow line L1 can be adjusted to be a predetermined pressure and the calibration gas can be allowed to stably flow from the container 10 to the fluid control equipment MFC.

Note that, in this embodiment, a third pressure sensor P3 is provided in the upstream side of the first on-off valve V1 in the outflow line L1.

Further, in the case where a large flow rate of the calibration gas is allowed to flow to the fluid control equipment MFC as described above, it is desirable that a heat exchanger 60 is provided in the outflow line L1 as shown in FIG. 2.

Thus, the large flow rate of the calibration gas can be adjusted to be a predetermined temperature and allowed to flow to the fluid control equipment MFC.

Furthermore, in the embodiment mentioned above, although a part of the common line L4 common to the outflow line L1 and the enclosing line L2 is formed of the flexible tube 50, a part of each of the outflow line L1 and the enclosing line L2 may be formed of the flexible tube 50 as shown in FIG. 2.

In addition, in the flow rate calculation system of the embodiment mentioned above, although it is configured that the calibration gas in the container is allowed to flow to the fluid control equipment to thereby calculate a flow rate of the calibration gas flowing to the fluid control equipment based on the output value outputted from the electronic balance, it may be also configured that the gas flowing in the fluid control equipment is allowed to flow into the container to thereby calculate the flow rate of the gas flowing in the fluid control equipment based on the output value outputted from the electronic balance.

Here, in the case where a differential pressure type mass flow controller is used as the fluid control equipment, it is necessary to keep a pressure in a secondary side (downstream side) of the fluid control equipment to be lower than a pressure in the primary side (upstream side) thereof. However, if it is attempted to calibrate this fluid control equipment using the flow rate calculation system described above, as the gas flowing in the fluid control equipment is allowed to flow into the container, the pressure in the secondary side increases and it becomes impossible to control the fluid with accuracy.

Therefore, in the case where the flow rate calculation system configured as described above is used for calibration of the fluid control equipment, a thermal mass flow controller is preferred to the differential pressure type mass flow controller for use as the fluid control equipment. Note that, in the case where a mass flow controller has a fluid control part such as a flow rate control valve in the downstream side of the sensor, it is suitable as an object to be calibrated using the flow rate calibration system configured as described above.

Moreover, in the embodiment mentioned above, although it is configured that the outflow line and the enclosing line are joined together, it may be configured that the outflow line and the enclosing line are connected to the container without being joined together.

Further, in the embodiment mentioned above, although a part of the outflow line and the enclosing line toward the container from the confluent point is shared, a line from the confluent point up to the container may be shared. In this case, it is preferable to provide an on-off valve and a pressure regulator in the common line.

More preferably, it is configured that the outflow line and the enclosing line are shared in a connected portion with the container (more specifically, a predetermined range from a connection end connected to the container).

In addition, in the embodiment mentioned above, although the check valve is provided in the enclosing line, it is not always necessary to provide this check valve, and, for example, it may be configured that the first pressure regulator in the outflow line is set in an opened state and the calibration gas in the gas cylinder (not shown) is allowed to be enclosed into the container from the outflow line.

Furthermore, although the flexible tube of the embodiment mentioned above is made of resin, it may be made of metal such as SUS.

With this configuration, the flexible tube is less deformable as compared to that made of resin, and since the flexible tube is hardly crushed at the time of decompressing the inside of the vacuum chamber and a diameter of the flexible tube is not changed, the gas can be allowed to stably flow to the fluid control equipment.

However, the metallic flexible tube has a large curvature as compared to resin one and it becomes necessary that the vacuum chamber is increased in size corresponding thereto. Because of this, in order to efficiently evacuate the inside of the vacuum chamber, the resin flexible tube is advantageous than the metallic flexible tube.

Further, although the information processing device of the embodiment mentioned above is intended to create a calibration curve, the fluid control equipment may be calibrated from a relationship between the output value from the thermal or pressure differential type flow sensor and an actual flow rate, or the fluid control equipment may be calibrated based on a relationship between an applied voltage of a flow rate control valve and an actual flow rate.

Furthermore, although the fluid control equipment of the embodiment mentioned above is a thermal or differential pressure type flow sensor and a mass flow controller with a flow rate control valve, the fluid control equipment may be a thermal or differential pressure type flow rate sensor per se or may be such as a pressure sensor.

In addition, the present invention is not limited to the embodiment mentioned above and it is needless to say that various modifications may be made in a range without departing from the spirit thereof.

LIST OF REFERENCE CHARACTERS

100 . . . Calibration system
200 . . . Flow rate calculation system
10 . . . Container
20 . . . Electric balance
30 . . . Information processing device
40 . . . Vacuum chamber
50 . . . Flexible tube
MFC . . . Fluid control equipment
L1 . . . Outflow line
L2 . . . Enclosing line

The invention claimed is:

1. A flow rate calculation system comprising:
a container in which gas is enclosed;
a weight measurement part on which the container is disposed;
a gas line which connects the container and fluid control equipment and in which the gas flows; and
an enclosing line for enclosing the gas in the container disposed on the weight measurement part, thereby allowing the gas to flow from the container to the fluid control equipment or from the fluid control equipment to the container in a state that the container is disposed on the weight measurement part, and calculating a flow rate of the gas flowing to the fluid control equipment based on an output value outputted from the weight measurement part, wherein
the container and the weight measurement part are placed in a decompressed decompression chamber.

2. The flow rate calculation system according to claim 1, wherein a part of the gas line is formed of a flexible tube located in the decompression chamber.

3. The flow rate calculation system according to claim 2, wherein the enclosing line is joined at a confluent point provided in the gas line and the part in a container side with respect to the confluent point in the gas line is formed of the flexible tube.

4. The flow rate calculation system according to claim 1, wherein at least a partial portion of the gas line and the enclosing line is shared in the decompression chamber.

5. A flow rate calculation method comprising:
allowing the gas to flow from the container to fluid control equipment or from the fluid control equipment to the container in a state that a container in which the gas is enclosed is disposed on a weight measurement part; and
calculating a flow rate of the gas flowing to the fluid control equipment based on an output value outputted from the weight measurement part, wherein
the container and the weight measurement part are placed in a decompressed decompression chamber.

* * * * *